United States Patent [19]
Sakamoto et al.

[11] Patent Number: 5,859,170
[45] Date of Patent: Jan. 12, 1999

[54] AROMATIC PLOYCARBODIIMINE AND SHEET USING IT

[75] Inventors: Michie Sakamoto; Amane Mochizuki; Mashiro Yoshioka, all of Osaka, Japan

[73] Assignee: Nitto Denko Corporation, Tokyo, Japan

[21] Appl. No.: 864,542

[22] Filed: May 28, 1997

[30] Foreign Application Priority Data

May 29, 1996 [JP] Japan .................................. 8-159080

[51] Int. Cl.$^6$ .................................................. C08G 73/00
[52] U.S. Cl. .............................. 528/170; 528/23; 528/28; 528/33; 528/65; 528/310; 528/322; 528/335; 528/336; 528/342; 528/353; 526/307.7
[58] Field of Search ............................. 528/28, 310, 322, 528/335, 336, 342, 33, 65, 23, 353, 170; 526/307.7

[56] References Cited

U.S. PATENT DOCUMENTS

| | | | |
|---|---|---|---|
| 4,118,536 | 10/1978 | Beardsley et al. | 528/28 |
| 5,254,412 | 10/1993 | Fujimoto | 528/125 |
| 5,334,686 | 8/1994 | Ando et al. | 526/307.7 |
| 5,357,021 | 10/1994 | Tye et al. | 528/28 |

FOREIGN PATENT DOCUMENTS

| | | |
|---|---|---|
| 2 367 089 | 5/1978 | France . |
| 53-47499 | 4/1978 | Japan . |

*Primary Examiner*—P. Hampton-Hightower
*Attorney, Agent, or Firm*—Sughrue, Mion, Zinn, MacPeak & Seas, PLLC

[57] ABSTRACT

An aromatic polycarbodiimide containing a siloxane bond in the polymer main chain thereof.

The polycarbodiimide can adhere at a low temperature in a short time and has a high heat resistance. The polycarbodiimide has a good adhesive property to an adherend such as semiconductor elements, has a low hygroscopic property and is excellent in the storage stability. Therefore, the polycarbodiimide can be stored for a long period of time at normal temperature.

11 Claims, 3 Drawing Sheets

AROMATIC PLOYCARBODIIMINE AND SHEET USING IT

FIELD OF THE INVENTION

The present invention relates to a noble polycarbodiimide and sheets using it. When the polycarbodiimide of the present invention is used as adhesives, surface protective films for semiconductor elements, and encapsulants for semiconductor elements, adhesion is possible at relatively low temperature for a short time.

BACKGROUND OF THE INVENTION

Hitherto, paste-like adhesives and adhesive materials obtained by coating an adhesive on heat-resistant substrates are known as adhesives for the fixing treatment of electric and electronic parts, such as semiconductor chips, substrates, lead frames, etc. The adhesives used are thermosetting resin adhesives such as epoxy resin adhesives, acrylic resin adhesives, or rubber-phenol adhesives. However, these adhesives have various problems that because high temperature and long time are required for heat curing, the adhesion workability is poor; a large amount of volatile components are generated in heat curing the adhesive and the volatile components thus generated soil leading wires; and because the adhesives have a high hygroscopic property, an encapsulating resin package of a semiconductor chip is cracked in reflowing a solder. Thus, it is hard to say that the conventional adhesives have a high reliability necessary for the adhesives for the fixing treatment of electric and electronic parts, and sufficiently satisfactory adhesives have not yet been obtained.

Also, a hot melt-type film adhesive using a polyimide resin can be heat-press adhered to an adherend in a short period of time, and where using the adhesive, a heat-curing step after adhering is unnecessary. However, the adhesive has a high glass transition point and a very high temperature is required for working. Therefore, there is a large possibility of giving heat damages to the adherend.

On the other hand, when an adhesive having a low glass transition point is used for giving a low-temperature workability, the heat resistance is poor and the reliability is decreased.

Furthermore, it is known that polycarbodiimide which has hitherto been widely used has a high heat resistance, and workability thereof is relatively good as compared with the polyimide resin adhesive. However, although the polycarbodiimide shows a low hygroscopic property under room temperature atmosphere, when the polycarbodiimide is allowed to stand under a humidified condition at high temperature and high pressure, such as a pressure cooker test (PCT), the polycarbodiimide is easily hydrolyzed to decrease the molecular weight and also the mechanical strength, thereby the polycarbodiimide cannot endure the practical use for electronic materials used for semiconductor elements, etc.

SUMMARY OF THE INVENTION

As a result of various investigations on resins which can adhere at low temperature for a short period of time in the normal state and have an excellent moisture resistance and an excellent heat resistance even under a humidified condition at high temperature and high pressure, it has been found that a polycarbodiimide containing a siloxane bond in the main chain satisfies such requirements. The present invention has been completed based on this finding.

Accordingly, an object of the present invention is to provide a polycarbodiimide containing a siloxane bond in the main chain.

According to one embodiment of the present invention, there is provided a polycarbodiimide containing a structural unit represented by the following formula (I)

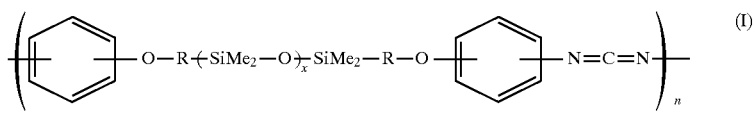

(I)

wherein R represents a single bond or an alkylene group having from 1 to 4 carbon atoms, x represents an integer of from 1 to 20, and n represents a positive integer.

In particular, the polycarbodiimide containing the structural unit represented by the following formula (III) which is the structural unit represented by the above formula (I) wherein x is 1;

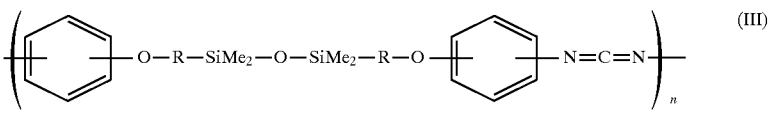

(III)

wherein R represents a single bond or an alkylene group having from 1 to 4 carbon atoms and n represents a positive integer is a resin having excellent thermosetting characteristics because the polycarbodiimide contains many carbodiimide units in the polymer molecule.

In the formula (I) and the formula (III) described above, n is preferably an integer of from 2 to 200.

According to another embodiment of the present invention, there is provided a copolymerized polycarbodiimide containing a structural unit represented by the following formula (IIa) and a structural unit represented by the following formula (IIb);

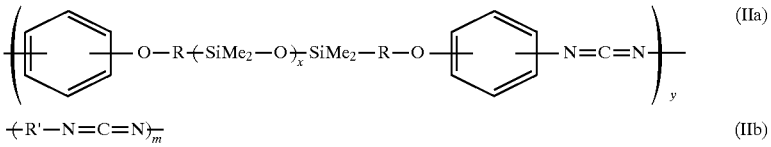

(IIa)

(IIb)

wherein R represents a single bond or an alkylene group having from 1 to 4 carbon atoms, x represents an integer of from 1 to 20, y represents a positive integer, R' represents a divalent organic group, y and m each represent a positive integer.

In particular, the copolymerized polycarbodiimide containing the structural unit represented by the following formula (IV) which is the structural unit represented by the above-described formula (IIa) wherein x is 1 together with the structural unit represented by the following formula (IIb);

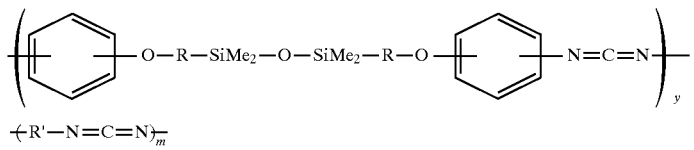
(IV)

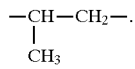
(IIb)

wherein R represents a single bond or an alkylene group having from 1 to 4 carbon atoms, y represents a positive integer, R' represents a divalent organic group, and y and m each represent a positive integer.

In the formula (IV) and the formula (IIb) described above, it is preferred that y+m is an integer of from 2 to 200.

DETAILED DESCRIPTION OF THE INVENTION

Figure 1:
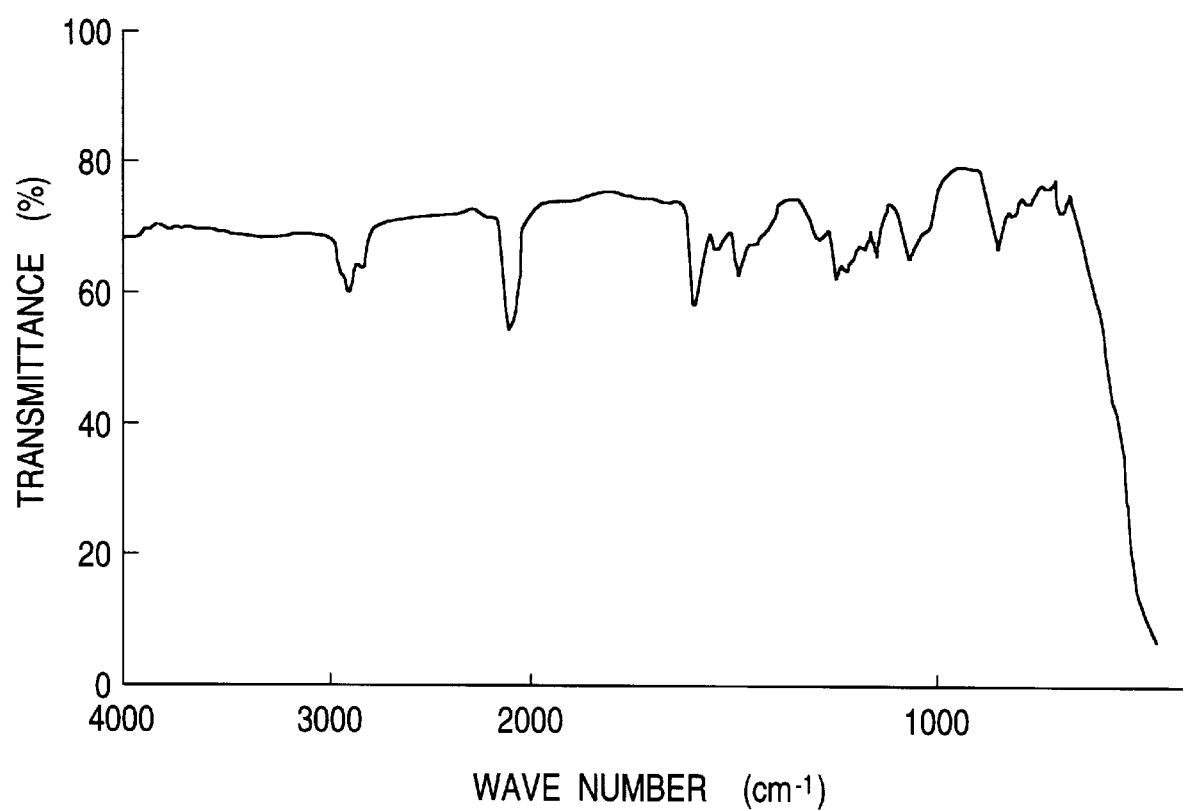
FIG. 1 is a graph showing an infrared absorption spectrum of the polymer obtained in Example 1.

The present invention is described in detail below.

The polycarbodiimide of the present invention has the structural unit represented by the formula (I) described above, wherein R represents an alkylene group having from 0 to 4 carbon atoms. R is preferably —(CH$_2$)$_p$— wherein p is from 0 to 4, or

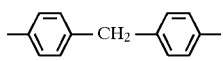

In the formula (I), x is an integer of from from 1 to 20, and n is preferably an integer of from 2 to 200, and more preferably from 8 to 40.

In the above-described copolymer containing structural unit represented by the formula (IIa) and the structural unit represented by the formula (IIb), R and x in the formula (IIa) are the same as defined above, y+m in the formulae (IIa) and (IIb) is an integer of from 2 to 200, and R' in the formula (IIb) is a divalent organic group and is specifically an aromatic divalent group represented by the following structural formulae:

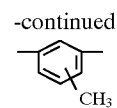
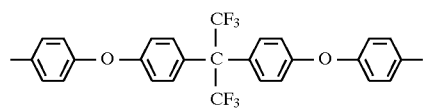

-continued
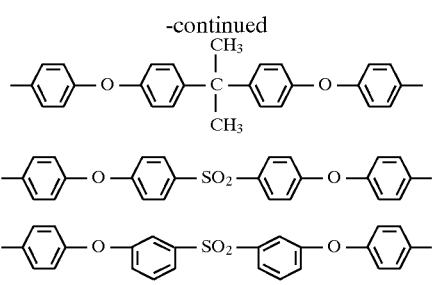

The polycarbodiimide described above can be produced by polymerizing a corresponding diisocyanate in the presence of a carbodiimidation catalyst such as a phosphorus catalyst by conventional method, or by reacting a corresponding bisurethane in the presence of a carbodiimidation catalyst, an organosilicon compound, and a basic compound.

(Production from Diisocyanate)

The diisocyanate which is a raw material for producing the polycarbodiimide can be produced by conventional methods. For example, there are a method of using bis(3- or 4-aminophenoxymethyl)tetramethyldisiloxane, etc., as a precursor, and forming the isocyanate thereof with phosgene, diphenyl carbonate, trimethylchlorosilane, etc.; a method of using a dicarboxylic acid of bis(3- or 4-carboxyphenoxymethyltetramethyl)disiloxane, etc., as an isocyanate precursor, and forming the isocyanate thereof by a Curtius decomposition; etc.

Polymerization of the diisocyanate having the siloxane bond may be carried out alone or may be copolymerized with other diisocyanate within an amount such that the inherent property thereof is not lost. Any aromatic diisocyanates can be used as such other diisocyanate. Examples of such other diisocyante include 2,2-bis(4-isocyanatophenoxyphenyl)propane, 2,2-bis(4-isocyanatophenoxyphenyl)hexafluoropropane, 1,3- or 1,4-bis(4-isocyanatophenoxy)benzene, 2,4- or 2,6-tolylene diisocyanate, 4,4'-diisocyanate-2,2'-dimethylbiphenyl, bis-(trifluoromethyl)biphenyl, diphenylmethane diisocyanate, 1-methoxyphenyl-2,4-diisocyanate, 3,3'-dimethoxy-4,4'-diphenylmethane diisocyanate, 4,4'-diphenyl ether diisocyanate, 3,3'-dimethyl-4,4'-diphenyl ether diisocyanate, and o-tolylene diisocyanate. However, the other diisocyanates are not limited to them.

The carbodiimidation catalyst (polymerization catalyst) which is used for producing the polycarbodiimide is generally a phosphorus catalyst. For example, phospholene oxides such as 3-methyl-1-phenyl-2-phospholene-1-oxide, 1-phenyl-2-phospholene-1-oxide, 3-methyl-2-phospholene-1-oxide, 1-ethyl-2-phospholene-1-oxide, 3-methyl-1-phenyl-2-phospholene-1-oxide, or 3-phospholene isomers of them can be used.

The amount of the catalyst used is generally from 0.1 to 10 mol %, preferably from 0.3 to 5 mol %, and more preferably from 0.5 to 3.0 mol %, per mole of the diisocyanate. If the amount of the catalyst used is too small, the catalyst is inactivated during the reaction to stop the polymerization. On the other hand, if the amount of the catalyst used is too large, it may be difficult to control the reaction.

The reaction temperature of the polymerization is generally from −50° to 200° C., preferably from −10° to 150° C., and more preferably from 20° to 120° C. However, the reaction temperature can be appropriately changed according to the combination of the kind of the diisocyanate used and a solvent. If the reaction temperature is lower than the above-described range, the reaction may not proceed. On the other hand, if the reaction temperature is too high or the heating time is too long, an undesirable side reaction may occur or the product formed may be decomposed. Thus, it is preferred to gradually raise the temperature from a low temperature by tracing the reaction with IR, etc., to proceed the reaction.

The reaction solvent which is used for the polymerization can be any solvents which can dissolve or suspend the diisocyanate. Examples of the solvent include ether solvents such as tetrahydrofuran, dioxane, diethyl ether, etc.; halogenated hydrocarbons such as dichloromethane, chloroform, dichloroethane, tetrachloroethane, etc.; ketone solvents such as acetone, methyl ethyl ketone, methyl isobutyl ketone, cyclohexanone, etc.; and aromatic hydrocarbons such as toluene, xylene, benzene, etc. These solvents may be used alone or as a mixture thereof. If required and necessary, the reaction temperature may be changed by replacing a part or the whole of the solvent during the reaction.

The concentration of the diisocyanate in the reaction mixture is from 1 to 50% by weight, preferably from 5 to 40% by weight, and more preferably from 10 to 30% by weight, based on the weight of the reaction mixture. If the concentration is lower than the above-described range, the reaction requires long time, which is not practical. If the concentration is higher than the above-described range, an undesirable side reaction may occur.

(Production from Bisurethane)

Other production method of the polycarbodiimide of the present invention is a method of reacting a bisurethane monomer with an organosilicon compound and a basic compound in the presence of the carbodiimidation catalyst.

Bisurethane

A bisurethane monomer can be synthesized by reacting the corresponding diamine with a halogenated formate. That is, urethane is synthesized by reacting bis(3- or 4-aminophenoxymethyltetramethyl) disiloxane with methyl chloroformate, ethyl chloroformate, phenyl chloroformate, p-nitrophenyl chloroformate, etc. In these formates, to obtain a sufficiently activated urethane for obtaining the polycarbodiimide, phenyl chloroformate or p-nitrophenyl chloroformate is more suitable.

The reaction solvent which is used for the above-described synthesis can be any solvents which dissolve the diamine. Examples of the reaction solvent include ether compounds such as tetrahydrofuran (THF), diethyl ether, dioxane, etc.; ketone compounds such as acetone, methyl ethyl ketone, etc.; ester compounds such as ethyl acetate, etc.; hydrocarbon compounds such as toluene, xylene, benzene, etc.; and halogenated hydrocarbon compounds such as chloroform, methylene chloride, etc. These solvents may be used alone or as a mixture thereof.

The reaction temperature is from −40° to 70° C., preferably from −20° to 50° C., and more preferably from 0° C. to 30° C. If the reaction temperature is lower than −40° C., the reaction is hard to proceed, and if the reaction temperature is higher than 70° C., an undesirable side reaction such as a condensation may occur.

A base for trapping hydrogen chloride formed in the formation of the bisurethane can be any bases which are dissolved in the solvent used and do not hinder the reaction. Examples of the base include triethylamine, pyridine, and sodium hydroxide.

The amount of the base used is preferably from 2.0 to 3.4 times the mole number of the diamine used.

For the purification of the bisurethane, a conventional method such as a recrystallization, a column chromatography, etc., can be used. Also, if necessary, a distillation may be carried out.

Production of Polycarbodiimide from Bisurethane

The organosilicon compound which is used as the catalyst for such a reaction includes halogenated organosilicon compounds. In particular, chlorosilanes such as trimethylchlorosilane, triethylchlorosilane, or trimethoxychlorosilane, tetrachlorosilane are suitable. Of these compounds, trimethylchlorosilane is most suitable from the points of the ease of handling and the economy.

It is preferred that the amount of the organosilicon compound used is from 2 to 4 times the molar amount of the bisurethane used. If the amount used is too less, unreacted raw materials sometimes remain. If the amount used is too large, it may be difficult to remove the catalyst after completion of the reaction and an undesirable side reaction may occur.

The basic compound which is used for producing the polycarbodiimide of the present invention is organic bases and inorganic bases. Organic bases are suitable from the point that they are easily dissolved in a solvent. In the organic bases, tertiary amines such as triethylamine, or pyridine are suitable in that they do not hinder the reaction. A primary amine and a secondary amine are not preferred because these amines each have an active hydrogen and has a possibility of reacting with an isocyanate which is considered to be formed as a reaction intermediate.

The amount of the basic compound used is preferably from 2.0 to 3.4 times the molar number of the diamine used.

The polymerization may be carried out using a silicon-containing urethane alone, and copolymerization of the silicon-containing urethane and other bisurethane compound may be carried out within the range that the property of the silicon-containing urethane is not lost. Other bisurethane compound can be any aromatic diamines. Examples of the aromatic diamine include urethanes derived from 2,2-bis(4-aminophenoxyphenyl)-propane, 2,2-bis(4-aminophenoxyphenyl)hexafluoropropane, 1,3- or 1,4-bis(4-aminophenoxy)benzene, 2,4- or 2,6-diaminotoluene, diaminodiphenylmethane, 4,4'-diamino-2,2'-dimethylbiphenyl, and bis(trifluoromethyl)biphenyl. However, the aromatic diamines are not limited to these compounds.

The above-described conventional phosphorus catalysts may be used as the carbodiimidation (polymerization) catalyst. That is, phospholene oxides such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and the 3-phospholene isomers thereof can be used.

The amount of the catalyst used is generally from 0.1 to 10 mol %, preferably from 0.3 to 5 mol %, and more preferably from 0.5 to 3.0 mol %, per mole of the bisurethane. If the amount of the catalyst used is too small, the catalyst is inactivated during the reaction, and the polymerization may stop. On the other hand, if the amount of the catalyst used is too large, it may be difficult to control the reaction.

The addition order of the catalyst can be appropriately selected. The carbodiimidation catalyst which is used for the polymerization may be added at the beginning of the reaction or may be added after first proceeding the reaction of the bisurethane with the organosilicon compound and the basic compound.

The reaction temperature in proceeding the polymerization reaction by the carbodiimidation is generally from $-50°$ to $200°$ C., preferably from $-10°$ to $150°$ C., and more preferably from $20°$ to $120°$ C., and the reaction temperature can be appropriately changed according to the combination of the bisurethane and the organosilicon compound used. If the reaction temperature is lower than $-10°$ C., the reaction may not proceed. On the other hand, if the reaction temperature is too high or the heating time is too long, a side reaction may occur, or the product formed may be decomposed. Accordingly, it is preferred to gradually proceed the reaction from a low temperature while tracing the reaction with IR, etc.

The reaction solvent can be any solvents which dissolve or suspend the urethane. Examples of the reaction solvent include ether compounds such as tetrahydrofuran, dioxane, diethyl ether, etc.; halogenated hydrocarbons such as dichloromethane, chloroform, dichloroethane, tetrachloroethane, etc.; ketone solvents such as acetone, methyl ethyl ketone, methyl isobutyl ketone, cyclohexanone, etc.; and aromatic hydrocarbons such as toluene, xylene, benzene, etc.

These solvents may be used alone or as a mixture thereof. If required and necessary, the reaction temperature can be changed by replacing a part or the whole of the solvent with other solvent during the reaction.

The concentration of the urethane in the reaction mixture is from 1 to 50% by weight, preferably from 5 to 40% by weight, and more preferably from 10 to 30% by weight, based on the weight of the reaction mixture. If the concentration of the urethane is too low, the reaction requires a long time, which is not practical. On the other hand, if the concentration is too high, an undesirable side reaction may occur.

There is no particular limitation on the degree of polymerization (n) of the polycarbodiimide of the present invention and the degree of polymerization (y+m) of the copolymerized polycarbodiimide of the present invention. However, (n) and (y+m) each are preferably an integer of from 2 to 200, and more preferably an integer of from 8 to 40. That is, a number average molecular weight (Mn) of these polymers is preferably from about 700 to about 1,000,000, and more preferably from about 1,500 to about 200,000.

The heat-resistant resin of the present invention may contain a fine inorganic filler in the range that the workability and the heat resistance thereof do not deteriorate. Also, to impart surface smoothness, various additives such as a smoothing agent, a leveling agent, or a defoaming agent may be added to the heat-resistant resin, if required and necessary.

The polycarbodiimide varnish of the present invention can be formed into a film by the conventional method to form an adhesive sheet. The thickness of the sheet is generally from 1 to 200 $\mu$m, but the thickness is not limited to the range and can be appropriately determined according to the purpose for the adhesion. Also, the form and the size of the sheet can be appropriately determined according to the adherend such as a lead frame, or a semiconductor chip.

In forming the adhesive sheet, for the purposes of imparting an electric conductivity, improving the heat conductivity, controlling the modulus of elasticity, and in particular increasing a modulus of elasticity, one or more kinds of various inorganic powders comprising metals or alloys, such as aluminum, copper, silver, gold, nickel, chromium, lead, tin, zinc, palladium, soft solder, etc.; ceramics such as alumina, silica, magnesia, silicon nitride, etc.; carbon, etc.; may be compounded with the polycarbodiimide varnish.

The coating temperature of the film is from $20°$ to $150°$ C., preferably from $50°$ to $120°$ C., and more preferably from $70°$ to $100°$ C. If the coating temperature is lower than $20°$ C., the solvent may remain in the film. If the coating temperature is higher than $150°$ C., heat-curing of the film may proceed.

The film may be formed on a support. To prepare the adhesive sheet of such a laminate structure, the polycarbodiimide varnish may be coated on a support or the film previously formed may be laminated on a support by pressing, etc.

A metal foil, an insulating film, etc., can be used as the support. Examples of the metal foil are aluminum, copper, silver, gold, nickel, indium, chromium, lead, tin, zinc, palladium, etc. Those metals may be used alone or an alloy of a plurality of metals may be used.

Various films having a heat resistance and a chemical resistance, such as films of polyimide, polyester, polyethylene phthalate, etc., can be used as the insulating film.

The metal foils and the insulating films described above each may be used alone, or a double layer structure of both the supports, that is, a double layer substrate material such as a metal foil/insulating film, may be used. The double layer substrate includes, for example, a copper/polyimide double layer substrate.

The adhesive sheet of the present invention shows a strong adhesive force when heat-cured by a heat treatment, and also forms a cured product having a low hygroscopic property. The heat treatment can be carried out by an appropriate method such as a heater, ultraviolet waves, or ultraviolet rays. Accordingly, the adhesive sheet of the present invention can be preferably used for the adhesive treatment of various materials and, in particular, is preferably used for the fixing treatment and the surface protection of electric and electronic parts such as semiconductor chips, lead frames, etc., requiring a low hygroscopic property and a fixing treatment with high reliability.

The adhesive sheet of the present invention is excellent in, for example, having a low heat expansion coefficient and showing an excellent dimensional stability to the change of temperature, having a low hygroscopic property, being enriched in the flexibility to easily handle, having a good adhesive property to semiconductor element, and having a good storage stability.

A varnish is prepared using the resin composition of the present invention, and a metal foil having an adhesive layer prepared by coating the varnish on one surface of the metal foil followed by drying is particularly useful for the production of a multilayer circuit substrate, etc.

The present invention is described in more detail by the following examples and comparative examples below.

The properties of the polycarbodiimides obtained were measured as follows.

Adhesive Property:

In each of the examples and the comparative examples, each resin varnish was spin-coated on a silicon wafer followed by drying and heat-treated as usual. The silicon wafer thus coated was allowed to stand in a pressure cooker test (Pressure Cooker Test Apparatus, Model TPC-411, trade name, manufactured by TABAI K. K., hereinafter referred to as "PCT") under the conditions of a temperature of 121° C., a pressure of 2 atms, and a humidity of 100% RH for a definite time. The adhesive property between the polycarbodiimide and the silicon wafer was evaluated. In the evaluation, in 100 squares of 1 mm square, when the released number of the squares was n, the result was shown by n/100.

The adhesive strength was measured using a Shimadzu autograph AGS-100D (trade name, manufactured by SHIMADZU CORPORATION).

EXAMPLE 1

In 1 liter three-necked flask were placed 61 g (0.16 mol) of 1,3-bis(3-aminophenoxymethyl)-1,1,3,3-tetramethylsiloxane, 600 ml of ethyl acetate, and 49 ml (0.35 mol) of triethylamine. 48 ml (0.38 mol) of phenyl chloroformate was placed in a dropping funnel and the three-necked flask was cooled to 0° C. in an ice bath. Phenyl formate was added dropwise to the mixture in the flask over 20 minutes, and the resulting mixture was stirred for 2 hours while raising the temperature to room temperature. Salts formed were removed by filtration, the solvent was evaporated off, and the residue was dried under a reduced pressure at 40° C. to obtain a white solid. When the white solid was recrystallized in toluene, 82 g (yield 83%) of the Si-urethane represented by the following formula (V) was obtained.

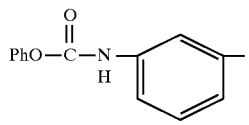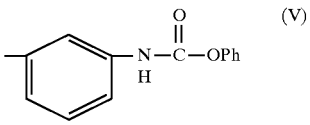

(V)

In 50 ml two-necked flask were placed 1.0 g (1.6 mmol) of the urethane obtained above, 10 ml of methylene chloride, 0.50 ml of triethylamine, and 0.0040 g (0.021 mmol) of a carbodiimidation catalyst (3-methyl-1-phenyl-2-phospholene-1-oxide). 0.46 ml (3.6 mmol) of trimethylchlorosilane was added to the resulting mixture at room temperature. After stirring the resulting mixture at room temperature for 10 minutes, the solvent was replaced with toluene, and while gradually rising the temperature to 80° C., the mixture was stirred for 4 hours. 0.08 ml (0.62 mmol) of m-tolylisocyanate was added to the reaction mixture followed by stirring for 2 hours, and salts formed were removed by filtration.

In infrared spectrum of the polymer obtained, the absorption of N=C=N (2110 cm$^{-1}$) was observed as shown in FIG. 1. Also, in proton nuclear magnetic resonance spectrum ($^1$H-NMR), the peak of the (SiMe)proton originated from the Si-urethane was observed. The molecular weight (Mn) of the polymer obtained was 8,000.

The resin varnish thus synthesized was spin-coated on a silicon wafer. After drying at 90° C. for 30 minutes, the coating was heat-treated at 250° C. for 1 hour.

EXAMPLE 2

In 50 ml two-necked flask equipped with a dropping funnel were placed 0.16 g (0.26 mmol) of the urethane synthesized in Example 1, 2.0 g (2.6 mmol) of an urethane compound of 2,2-bis(4-aminophenoxyphenyl) hexafluoropropane represented by the following formula (VI) (BAPF-urethane), 22 ml of methylene chloride, 0.88 ml (6.3 mmol) of triethylamine, and 0.0046 g (0.024 mmol) of a carbodiimidation catalyst.

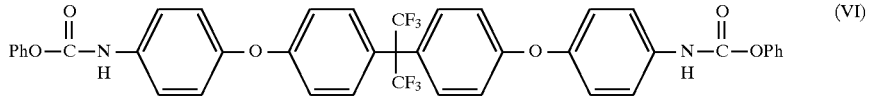

(VI)

0.80 ml (6.3 mmol) of trimethylchlorosilane was placed in the dropping funnel, and trimethylchlorosilane was added dropwise to the mixture in the flask over 2 minutes at room temperature. After replacing the solvent with toluene, the mixture was stirred for 4 hours while gradually raising the temperature to 80° C. 0.17 ml (1.3 mmol) of m-tolyl isocyanate was added to the reaction mixture obtained followed by stirring for 2 hours, and salts formed were removed by filtration.

Figure 2:
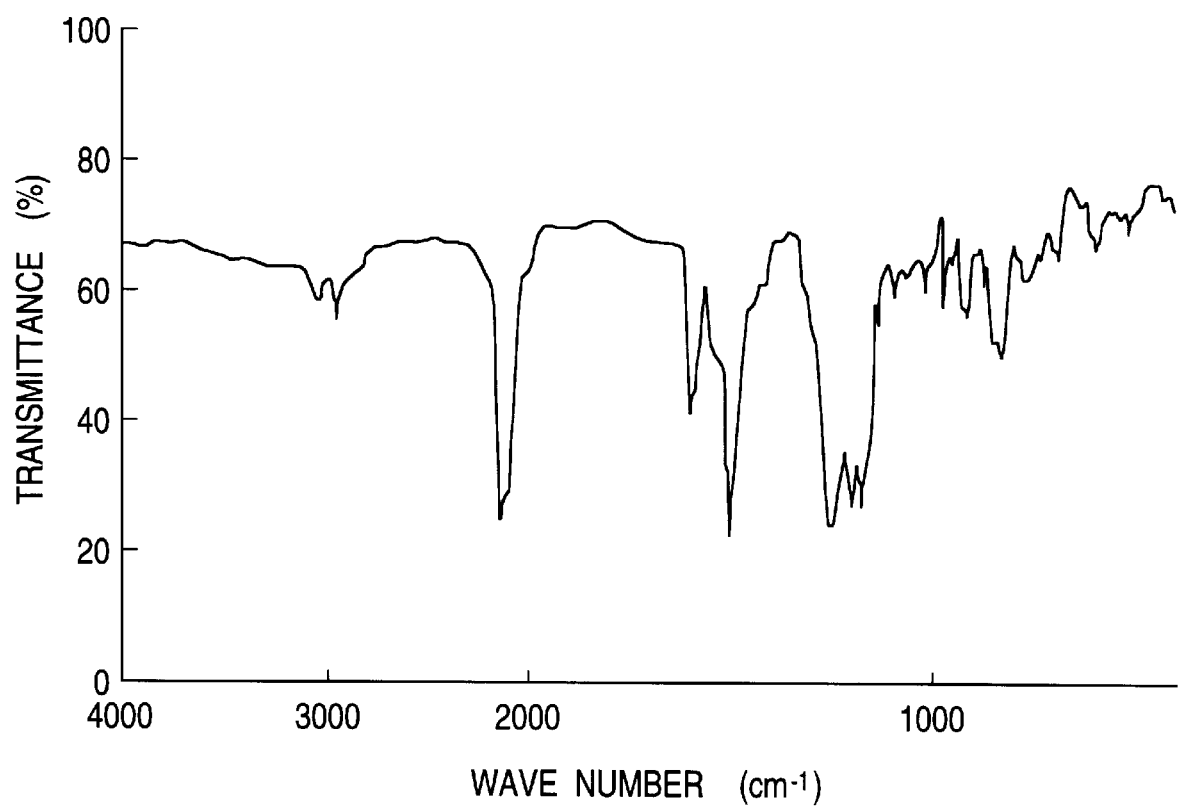
FIG. 2 is a graph showing an infrared absorption spectrum of the polymer obtained in Example 2.

In infrared absorption spectrum of the polymer obtained, the absorption of carbodiimide (N=C=N) was observed at 2,120 cm$^{-1}$ as shown in FIG. 2. In proton nuclear magnetic resonance spectrum ($^1$H-NMR), the peak of the (Si-Me) proton originated from the Si-urethane was observed at 0.30 ppm. The molecular weight (Mn) of the polymer was 17,000.

The resin varnish thus synthesized was spin-coated on a silicon wafer. After drying at 90° C. for 30 minutes, the coating was heat-treated at 250° C. for 1 hour.

EXAMPLE 3

The same procedure as in Example 2 was followed except that a mixture of 0.34 g (0.55 mmol) of the urethane obtained in Example 1 and 2.0 g of the urethane compound of 2,4-tolylene diisocyanate (TDI-urethane) represented by the following formula (VII) was used as the monomer, to obtain a polycarbodiimide.

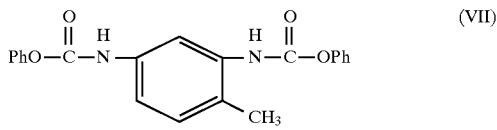

Figure 3:
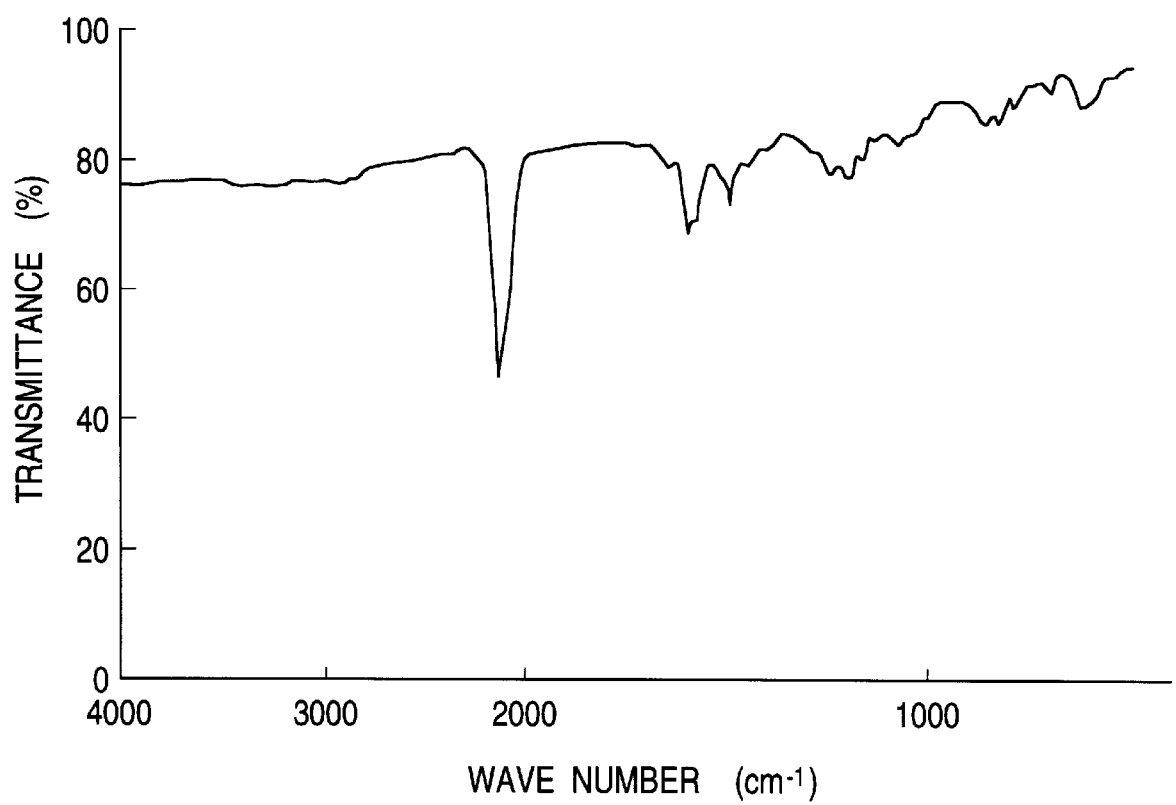
FIG. 3 is a graph showing an infrared absorption spectrum of the polymer obtained in Example 3.

In infrared absorption spectrum of the polymer obtained, the absorption of carbodiimide (N=C=N) was observed at 2,120 cm$^{-1}$ as shown in FIG. 3. In proton nuclear magnetic resonance spectrum ($^1$H-NMR), the peak of the ($C_6H_5CH_3$) proton originated from the TDI-urethane and the peak of the (SiMe) proton originated from the Si-urethane were observed at 2.33 ppm and 0.27 ppm, respectively. The molecular weight (Mn) of the polymer was 3,600.

The resin varnish was spin-coated on a silicon wafer, dried at 90° C. for 30 minutes, and heat-treated at 200° C. for 1 hour.

COMPARATIVE EXAMPLE 1

The same procedure as in Example 2 was followed except that 2.0 g (2.6 mmol) of the BAPF-urethane was used as the monomer, to obtain a polycarbodiimide.

The varnish obtained was spin-coated on a silicon wafer, dried at 90° C. for 30 minutes, and heat-treated at 250° C. for 1 hour.

COMPARATIVE EXAMPLE 2

The same procedure as in Example 2 was followed except that 2.0 g (5.5 mmol) of the TDI-urethane as used in Example 3 was used as the monomer, to obtain a polycarbodiimide.

The varnish obtained was spin-coated on a silicon wafer, dried at 90° C. for 30 minutes, and heat-treated at 200° C. for 1 hour.

The results of the adhesive property test of each of the samples prepared in Examples 1 to 3 and Comparative Examples 1 and 2 are shown in Table 1 below.

TABLE 1

| Allowed Time in PCT (hr) | Example 1 | Example 2 | Example 3 | Comparative Example 1 | Comparative Example 2 |
|---|---|---|---|---|---|
| 0   | 0/100 | 0/100 | 0/100 | 47/100  | 1/100   |
| 16  | 0/100 | 2/100 | 0/100 | 100/100 | 100/100 |
| 82  | 0/100 | 8/100 | 0/100 | —       | —       |
| 144 | 0/100 | 4/100 | 0/100 | —       | —       |
| 234 | 0/100 | 3/100 | 0/100 | —       | —       |
| 298 | 0/100 | 4/100 | 0/100 | —       | —       |

EXAMPLE 4

The varnish synthesized in Example 2 was casted on one surface of a stainless steel plate which had been surface polished, dried at 90° C. for 30 minutes, and peeled from the plate to prepare an adhesive sheet having a thickness of 30 μm. The adhesive sheet was inserted between a copper plate and a copper foil, and they were adhered each other by pressing at a pressure of 50 kg/cm$^2$ at 200° C. for 2 minutes. When the adhesive force was measured, the adhesive force was 980 g/cm$^2$. Further, the adhesive force after placing the assembly in PCT for 100 hours was 850 g/cm$^2$.

EXAMPLE 5

The polycarbodiimide varnish synthesized in Example 2 was casted on a rolled copper foil in place of the surface polished stainless steel plate used in Example 4 to prepare an adhesive sheet of a double layer structure. The adhesive sheet was adhered to a glass plate by pressing at a pressure of 50 kg/cm$^2$ at 200° C. for 20 minutes. When the adhesive force (180° peeling) was measured, the adhesive force was 60 g/cm$^2$. The adhesive force after placing the assembly in PCT for 100 hours was 890 g/cm$^2$.

COMPARATIVE EXAMPLE 3

The same procedure as in Example 4 was followed using the varnish synthesized in Comparative Example 1, to prepare an adhesive sheet having a thickness of 25 μm. Two copper plates were adhered each other using the adhesive sheet as in Example 4. When the adhesive force was measured, the adhesive force was 800 g/cm$^2$. The adhesive force after placing the assembly in PCT for 100 hours was 110 g/cm$^2$.

As described above, the polycarbodiimide of the present invention is excellent in the humidity resistance and heat resistance under a humidified condition at high temperature and high pressure. Further, since the glass transition point of the polycarbodiimide of the present invention is near 200° C., the workability thereof at low temperature is improved. Also, the polycarbodiimide has a good adhesive property to adherends such as semiconductor elements, etc., has a low hygroscopic property and is excellent in the storage stability, whereby it can be stored for a long period of time at normal temperature.

While the invention has been described in detail and with reference to specific embodiments thereof, it will be apparent to one skilled in the art that various changes and modifications can be made therein without departing from the spirit and scope thereof.

What is claimed is:

1. An aromatic polycarbodiimide containing a siloxane bond in a repeating structural unit of the polymer main chain.

2. The polycarbodiimide of claim 1, wherein the polycarbodiimide contains a structural unit represented by the following formula (I);

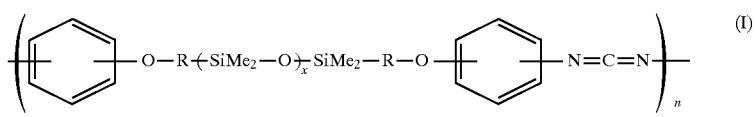

wherein R represents a single bond or an alkylene group having from 1 to 4 carbon atoms; x represents an integer of from 1 to 20; and n represents a positive integer.

3. The polycarbodiimide of claim 2, wherein the polycarbodiimide contains a structural unit represented by the following formula (III) which is the formula (I) wherein x is 1;

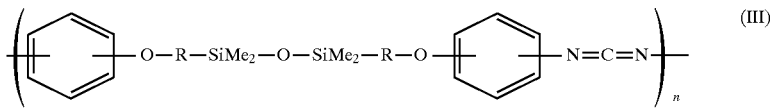

wherein R represents a single bond or an alkylene group having from 1 to 4 carbon atoms, and n represents a positive integer.

4. The polycarbodiimide of claim 2, wherein n in the formula (I) is an integer of from 2 to 200.

5. The polycarbodiimide of claim 3, wherein n in the formula (III) is an integer of from 2 to 200.

6. A copolymerized polycarbodiimide containing a structural unit represented by the following formula (IIa) and a structural unit represented by the following formula (IIb);

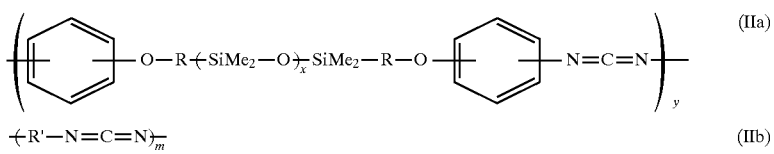

wherein R represents single bond or an alkylene group having from 1 to 4 carbon atoms; x represents an integer of from 1 to 20; y represents a positive integer; R' represents a divalent organic group; and m represents a positive integer.

7. A copolymerized polycarbodiimide of claim 6, wherein the polycarbodiimide contains a structural unit represented by the following formula (IV) which is the formula (IIa) wherein x is 1 and the structural unit represented by the following formula (IIb);

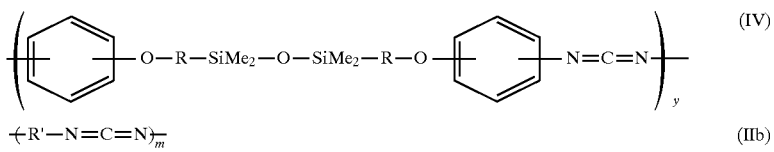

wherein R represents a single bond or an alkylene group having from 1 to 4 carbon atoms; y represent a positive integer; R' represents a divalent organic group; and m represents a positive integer.

8. The copolymerized polycarbodiimide of claim 6, wherein y+m in the formula (IIa) and the formula (IIb) is an integer of from 2 to 200.

9. The copolymerized polycarbodiimide of claim 7, wherein y+m in the formula (IIa) and the formula (IV) is an integer of from 2 to 200.

10. An adhesive sheet comprising a thermosetting resin which comprises the polycarbodiimide of claim 1, said thermosetting resin being formed into a sheet form.

11. A laminate layer adhesive sheet comprising a support having formed on at least one surface thereof the thermosetting resin comprising the polycarbodiimide of claim 1.

* * * * *